(12) United States Patent
Li

(10) Patent No.: US 8,289,693 B2
(45) Date of Patent: Oct. 16, 2012

(54) DISK DRIVE ASSEMBLY

(75) Inventor: Zhan-Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 376 days.

(21) Appl. No.: 12/723,705

(22) Filed: Mar. 15, 2010

(65) Prior Publication Data

US 2011/0134599 A1 Jun. 9, 2011

(30) Foreign Application Priority Data

Dec. 4, 2009 (CN) .......................... 2009 2 0316551

(51) Int. Cl.
*G06F 1/16* (2006.01)
(52) U.S. Cl. ......... 361/679.34; 361/679.33; 361/679.36; 720/688; 720/689; 312/223.1; 312/223.2
(58) Field of Classification Search ............. 361/679.33, 361/679.34
See application file for complete search history.

(56) References Cited

U.S. PATENT DOCUMENTS

| | | | |
|---|---|---|---|
| 6,283,438 B1 * | 9/2001 | Shimada et al. | 248/694 |
| 6,351,374 B1 * | 2/2002 | Sherry | 361/679.33 |
| 6,560,099 B1 * | 5/2003 | Chang | 361/679.4 |
| 6,873,524 B2 * | 3/2005 | Kaczeus et al. | 361/679.33 |
| 7,251,131 B2 * | 7/2007 | Shah et al. | 361/679.33 |
| 8,094,445 B2 * | 1/2012 | Lee | 361/679.33 |
| 2006/0181845 A1 * | 8/2006 | Shah et al. | 361/685 |
| 2009/0310303 A1 * | 12/2009 | Najbert | 361/695 |
| 2010/0039766 A1 * | 2/2010 | Chiang et al. | 361/679.34 |

* cited by examiner

*Primary Examiner* — Anthony Q Edwards
(74) *Attorney, Agent, or Firm* — Altis Law Group, Inc.

(57) ABSTRACT

A disk drive assembly includes a drive bracket, a disk drive, a transfer connector, and a connecting cable. The drive bracket includes a rear panel and two parallel side panels perpendicular to the rear panel. The disk drive is received in the drive bracket between the two side panels. The disk drive has a connecting port defined therein. The transfer connector is secured to the drive bracket. The transfer connector includes a first connector and a second connector capable of connecting to an electronic device. The connecting cable is connected between the connecting port and the first connector and capable of absorbing a vibration between the disk drive and the transfer connector.

13 Claims, 4 Drawing Sheets

DISK DRIVE ASSEMBLY

BACKGROUND

1. Technical Field

The present disclosure relates to disk drive assemblies, especially to a vibration dampening disk drive assembly.

2. Description of Related Art

Electronic devices, such as disk drives (for example, hard disk drives and floppy disk drives), are usually installed in a computer as mass storage devices. When the disk drive is reading or writing data to a disk, the disk drive may vibrate due to the spinning of the disk, this vibration may result in damage to the disk drive.

There are many ways to secure the disk drive to the computer. For example, the disk drives are screwed into mounting brackets of the computers. However, if the diameters of the screw holes do not exactly match the diameters of the screws, gaps will exist between the screws and the sides of the screw holes in the disk drive, thereby allowing vibration to occur.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
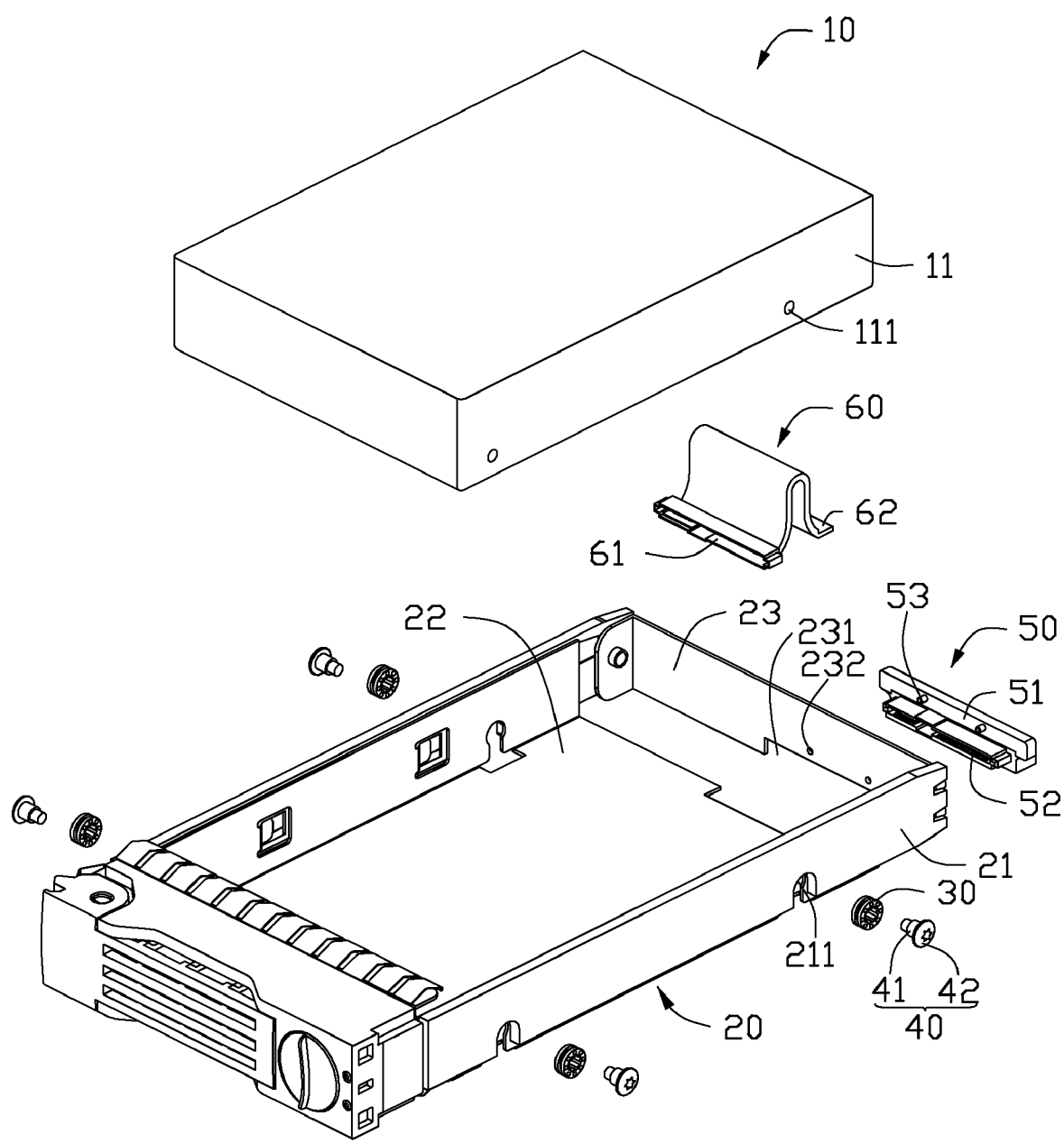
FIG. 1 is an exploded, isometric view of a disk drive assembly in accordance with an embodiment of the present disclosure.
Figure 2:
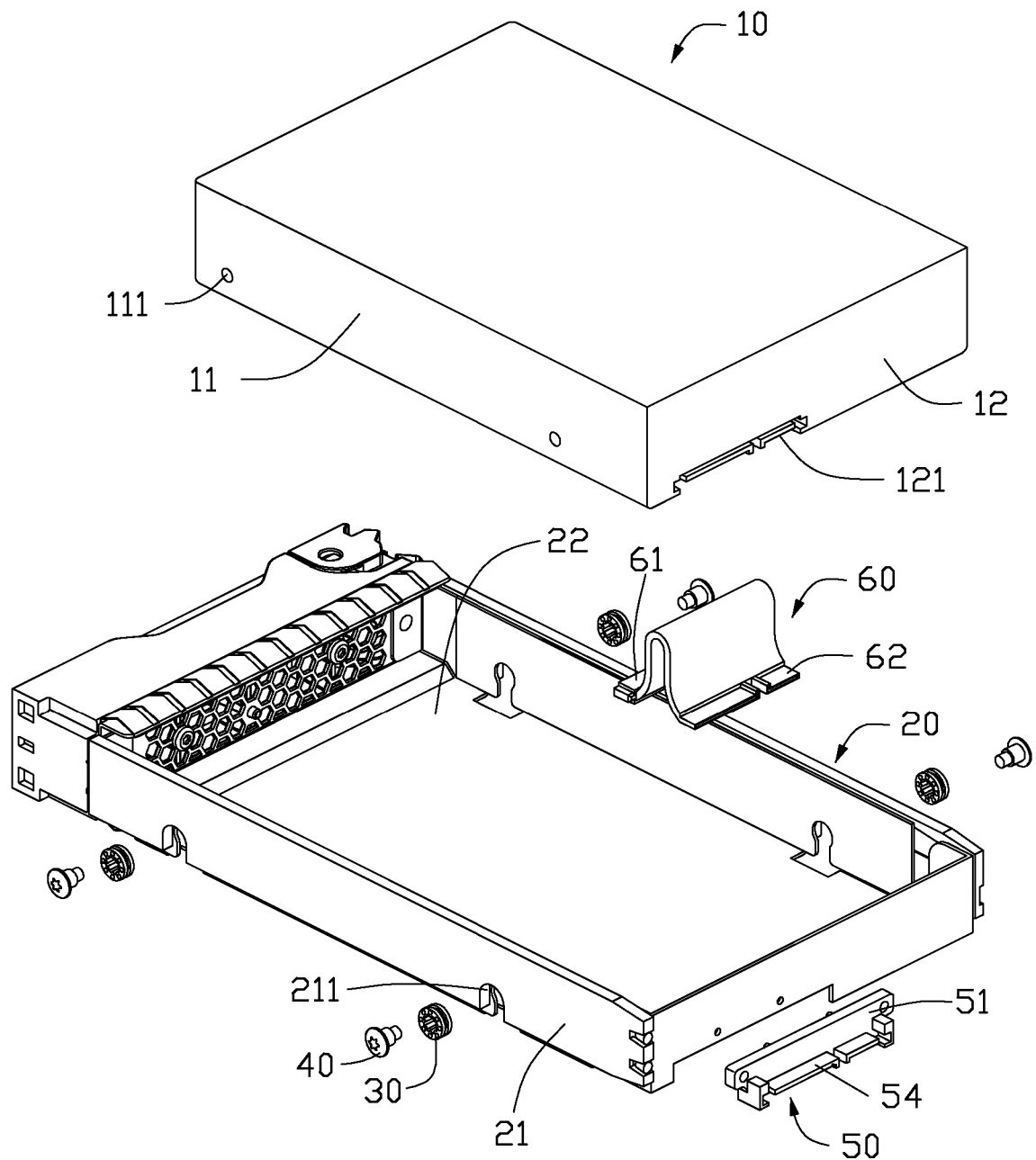
FIG. 2 is similar to FIG. 1, but viewed from another aspect.

Referring to FIG. 1 and FIG. 2, a disk drive assembly of an embodiment of the present invention includes a disk drive 10, and a drive bracket 20 for receiving the disk drive 10 therein.

The disk drive 10 includes two parallel side walls 11, and a rear wall 12 connecting with the two side walls 11. Two mounting holes 111 are defined in each side wall 11. A connecting port 121 is defined in the rear wall 12.

The drive bracket 20 includes two parallel side panels 21, a bottom panel 22 connecting the two side panels 21, and a rear panel 23 perpendicular to the bottom panel 22. Two openings 211 are defined in each side panel 21. A transfer connector 50 is mounted to the rear panel 23. The rear panel 23 includes a receiving opening 231 defined therein for receiving the transfer connector 50, and two locating holes 232. A dampening element 30 is installed in each opening 211.

Four mounting members 40 are configured to secure the disk drive 10 to the drive bracket 20. Each mounting member 40 includes a head portion 41; and a mounting portion 42 extending from the head portion 41.

The transfer connector 50 includes a connecting body 51. The connecting body 51 has a first connector 52 formed on one side thereof for connecting the connecting port 121 of the disk drive 10, and a second connector 54 formed on the other side thereof for connecting to an electronic device (not shown). Two locating posts 53 protrude from the connecting body 51 corresponding to the locating holes 232 of the drive bracket 20. The first connector 52 is capable of connecting to the connecting port 121 of the disk drive 10 through the receiving opening 231 and connecting to a flexible connecting cable 60 for absorbing vibrations between the disk drive and the drive bracket 20.

The connecting cable 60 includes a first connecting end 61 for connecting to the connecting port 121, and a second connecting end 62 for connecting to the first connector 52.

Figure 3:
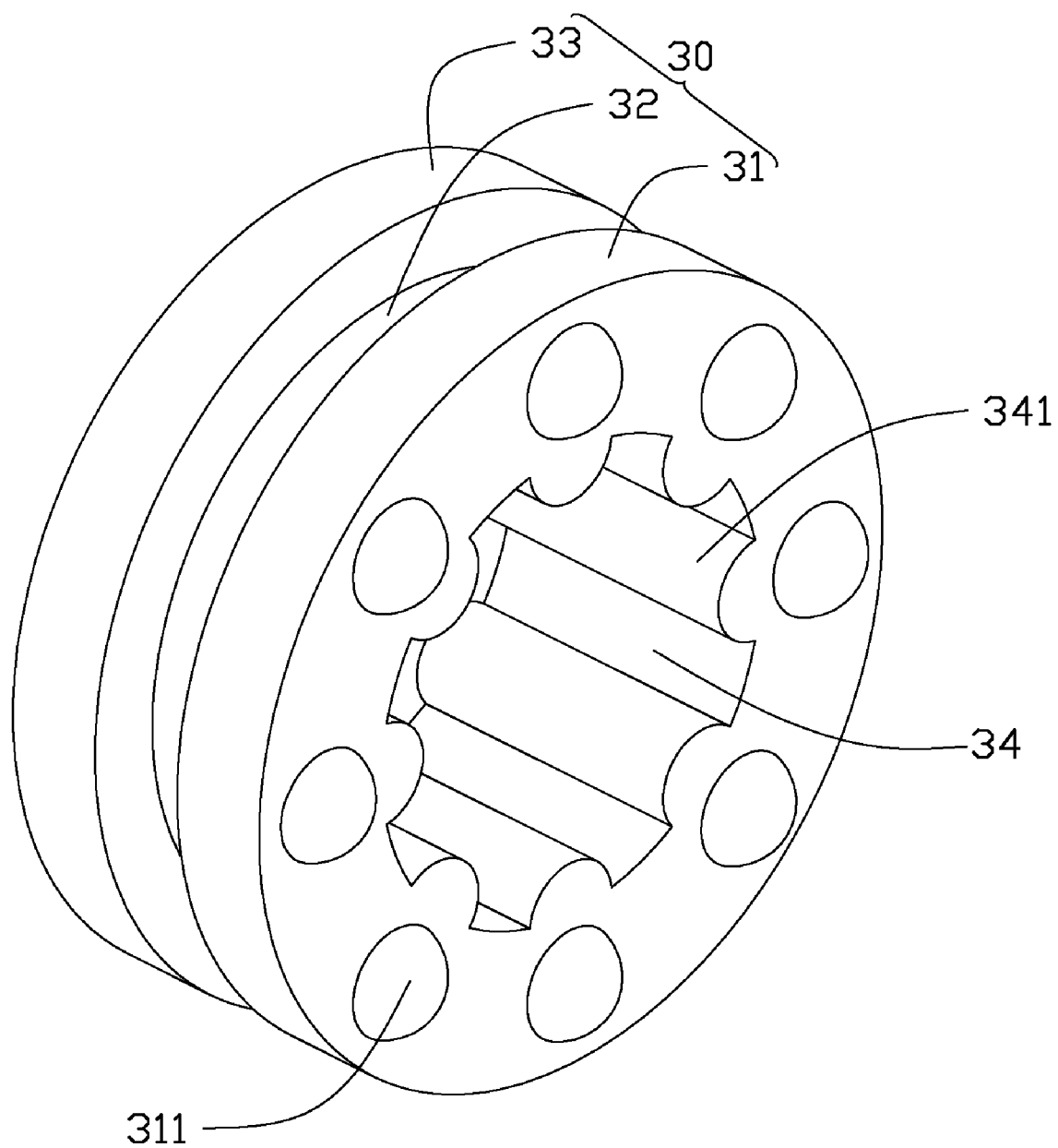
FIG. 3 is an isometric view of a dampening element of FIG. 1.
Figure 4:
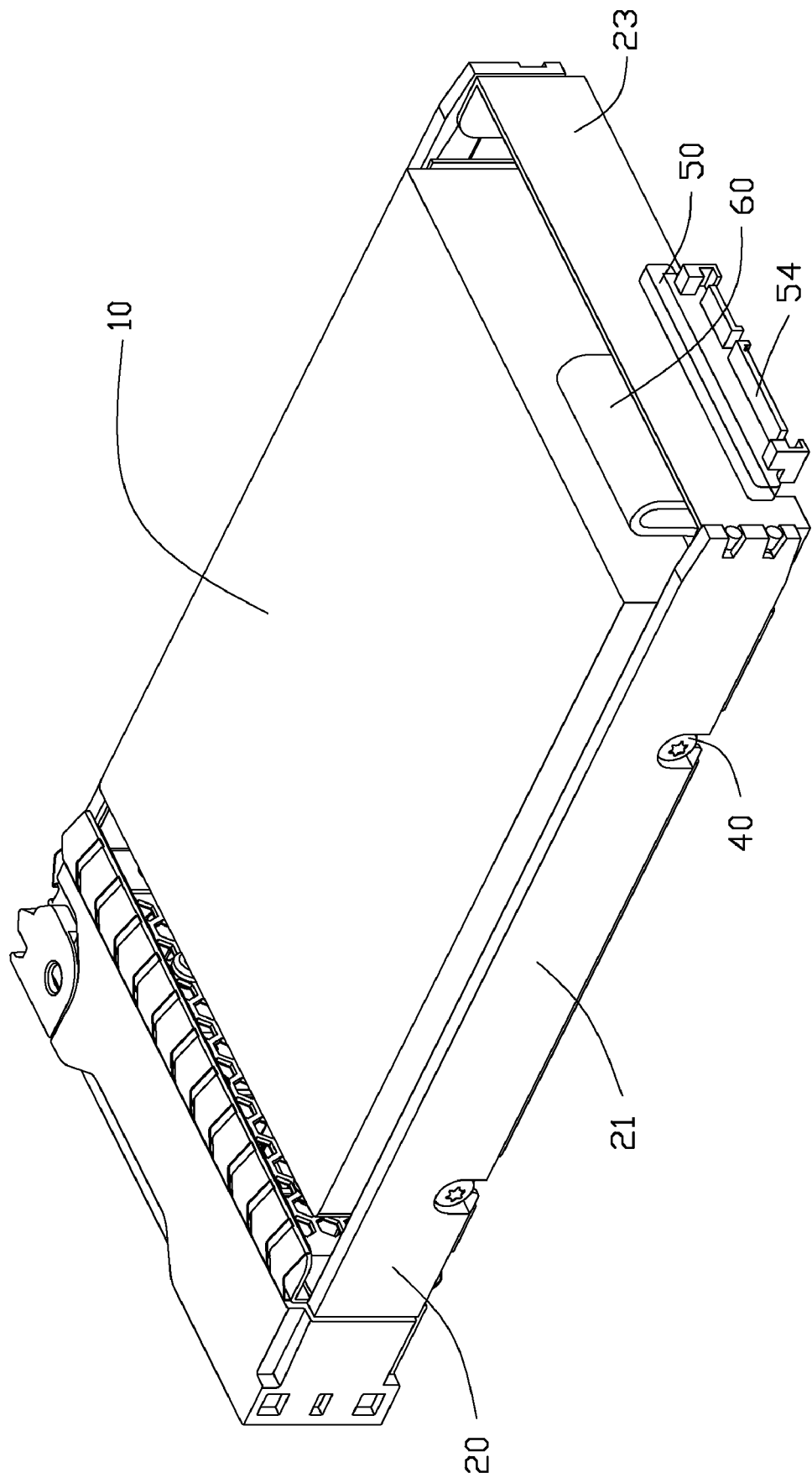
FIG. 4 is an assembled view of the disk drive assembly of FIG. 1.

Referring to FIG. 3, each dampening element 30 includes a first shock-absorbing portion 31, a connecting portion 32 extending from the first shock-absorbing portion 31, and a second shock-absorbing portion 33 extending from the connecting portion 32. The second shock-absorbing portion 33 has the same structure as the first shock-absorbing portion 31. A plurality of protrusions 311 protrudes from the first shock-absorbing portion 31, and a plurality of protrusions (not shown) also protrude from the second shock-absorbing portion 33. A through hole 34 is defined in the dampening element 30 running through the first shock-absorbing portion 31, the connecting portion 32, and the second shock-absorbing portion 33, thereby forming an inner surface in the dampening element 30. The through hole 34 corresponds to the head portion 41 of the mounting member 40. A plurality of protruding portions 341 is disposed on the inner surface of the dampening element 30.

Referring to FIG. 1 through FIG. 4, in assembly, the first connector 52 of the transfer connector 50 is received in the receiving opening 231 of the rear panel 23. The two locating posts 53 of the transfer connector 50 are inserted into the corresponding locating holes 232 of the rear panel 23. The dampening elements 30 are installed in the corresponding openings 211 of the drive bracket 20. The disk drive 10 is placed in the drive bracket 20, and the mounting holes 111 are aligned with the corresponding through holes 34 of the dampening elements 30. The four mounting members 40 are secured in the corresponding mounting holes 111 of the disk drive 10 through the corresponding through holes 34 of the dampening elements 30, thereby securing the disk drive 10 in the drive bracket 20. At this time, the head portions 41 of the mounting members 40 abut the protrusions 311 of the first shock-absorbing portions 31 of the corresponding dampening elements 30. The mounting portions 42 of the mounting members 40 abut the protruding portions 341 of the corresponding dampening elements 30, and the protrusions of the second shock-absorbing portions 33 abut the corresponding sides of the mounting holes 111 of the disk drive 10. The first connecting end 61 of the connecting cable 60 is connected to the connecting port 121 of the disk drive 10, and the second connecting end 62 of the connecting cable 60 is connected to the first connector 52 of the transfer connector 50. Thus, the disk drive assembly is assembled.

The dampening elements 30 are located between the disk drive 10 and the drive bracket 20, and the connecting cable 60 is connected between the connecting port 121 of the disk drive 10 and the transfer connector 50. Therefore, vibrations between the disk drive 10 and the drive bracket 20, and between the disk drive 10 and the transfer connector 50 are dampened.

It is to be understood, however, that even though numerous characteristics and advantages of the present invention have been set forth in the foregoing description, together with details of the structure and function of the disclosure, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A disk drive assembly, comprising:
a drive bracket, the drive bracket comprising a rear panel, the rear panel defining a locating hole;
a disk drive received in the drive bracket, the disk drive having a connecting port defined therein;
a transfer connector, the transfer connector comprising a body, a first connector extending from a first side of the body, a locating post extending from the first side, and a second connector extending from a second side of the body opposite to the first side; the locating post received in the locating hole to secure the transfer connector to the rear panel; and the second connector capable of connecting to an electronic device; and
a flexible connecting cable connected between the connecting port and the first connector and capable of absorbing vibration between the disk drive and the transfer connector.

2. The disk drive assembly of claim 1, wherein a receiving opening is defined in the rear panel for receiving the first connector of the transfer connector.

3. The disk drive assembly of claim 1, wherein the disk drive comprises two opposite side walls, at least one mounting hole is defined in each side wall of the disk drive; the drive bracket comprises two parallel side panels connected to the rear panel, an opening is defined in each side panel of the drive bracket corresponding to the at least one mounting hole, a mounting member is secured in the at least one mounting hole of the disk drive through the opening of the drive bracket.

4. The disk drive assembly of claim 3, wherein the drive bracket further comprises a bottom panel connected between the two side panels; the two side panels are substantially perpendicular to the bottom panel; a dampening element is located in the opening of the drive bracket; and the mounting member is secured in the at least one mounting hole of the disk drive through the dampening element.

5. The disk drive assembly of claim 4, wherein the mounting member comprises a head portion, and a mounting portion extending from the head portion; a through hole is defined in the dampening element, the mounting portion of the mounting member is secured in the at least one mounting hole through the through hole.

6. The disk drive assembly of claim 5, wherein the dampening element comprises a first shock-absorbing portion, a connecting portion extending from the first shock-absorbing portion, and a second shock-absorbing portion extending from the connecting portion, the through hole is running through the first shock-absorbing portion, the connecting portion, and the second shock-absorbing portion to form an inner surface in the dampening element.

7. The disk drive assembly of claim 6, wherein at least one protrusion protrudes from the first shock-absorbing portion and abuts the head portion of the mounting member, at least one protruding portion is disposed in the inner surface of the dampening element and abuts the mounting portion.

8. A disk drive assembly, comprising:
a drive bracket, the drive bracket comprising a rear panel, the rear panel defining a locating hole;
a disk drive received in the drive bracket, the disk drive having a connecting port;
a transfer connector, the transfer connector comprising a body, a first connector extending from a first side of the body, a locating post extending from the first side, and a second connector extending from a second side of the body opposite to the first side; and the locating post is received in the locating hole to secure the transfer connector to the rear panel;
a connecting cable connected between the connecting port and the transfer connector for absorbing vibration between the disk drive and the transfer connector; and
a dampening element located between the disk drive and the drive bracket for absorbing vibration between the disk drive and the drive bracket.

9. The disk drive assembly of claim 8, wherein the drive bracket comprises two parallel side panels perpendicular to the rear panel, the disk drive is received between the two side panels.

10. The disk drive assembly of claim 9, wherein the drive bracket further comprises a bottom panel connected between the two side panels; the two side panels are substantially perpendicular to the bottom panel; the disk drive has two opposite side walls; at least one mounting hole is defined in each side wall of the disk drive; an opening is defined in each side panel of the drive bracket corresponding to the at least one mounting hole; the dampening element is located in the opening of the drive bracket; a mounting member is secured in the at least one mounting hole of the disk drive through the dampening element.

11. The disk drive assembly of claim 10, wherein the mounting member comprises a head portion, and a mounting portion extending from the head portion, a through hole is defined in the dampening element, the mounting portion of the mounting member is secured in the at least one mounting hole through the through hole.

12. The disk drive assembly of claim 11, wherein the dampening element comprises a first shock-absorbing portion, a connecting portion extending from the first shock-absorbing portion, and a second shock-absorbing portion extending from the connecting portion, the through hole is running through the first shock-absorbing portion, the connecting portion, and the second shock-absorbing portion to form an inner surface in the dampening element.

13. The disk drive assembly of claim 12, wherein at least one protrusion protrudes from the first shock-absorbing portion and abuts the head portion of the mounting member, at least one protruding portion is disposed in the inner surface of the dampening element and abuts the mounting portion.

* * * * *